United States Patent [19]
Völpel et al.

[11] Patent Number: 5,358,225
[45] Date of Patent: Oct. 25, 1994

[54] TELESCOPIC SPRING UNIT

[75] Inventors: Stefan Völpel, Koblenz; Helmut Morgen, Mannebach, both of Fed. Rep. of Germany; Errick G. Morris, Doylestown, Pa.

[73] Assignee: Stabilus GmbH, Koblenz-Neuendorf, Fed. Rep. of Germany

[21] Appl. No.: 65,575

[22] Filed: May 21, 1993

[30] Foreign Application Priority Data

May 22, 1992 [DE] Fed. Rep. of Germany ....... 4216990

[51] Int. Cl.$^5$ .............................. F16F 5/00; F16F 9/32
[52] U.S. Cl. ................................. 267/64.12; 188/300; 267/120; 16/84
[58] Field of Search ...................... 267/64.12, 120, 124; 188/300, 322.12; 296/56, 76, 146.8; 16/82, 84

[56] References Cited

U.S. PATENT DOCUMENTS

| | | | |
|---|---|---|---|
| 3,851,867 | 12/1974 | Fricko | 267/120 |
| 3,883,126 | 5/1975 | Nicholls | 267/64.12 |
| 4,449,702 | 5/1984 | Hasegawa | 267/64.12 |
| 4,596,383 | 6/1986 | Howard | 267/64.12 |
| 4,744,548 | 5/1988 | Hathaway | 267/64.12 |
| 4,813,100 | 3/1989 | King | 267/64.12 X |
| 4,824,082 | 4/1989 | Schaupp | 267/64.12 X |

FOREIGN PATENT DOCUMENTS

3433735  4/1990  Fed. Rep. of Germany.
5614636  2/1981  Japan.

*Primary Examiner*—Robert J. Oberleitner
*Assistant Examiner*—Kevin D. Rutherford
*Attorney, Agent, or Firm*—Brumbaugh, Graves, Donohue & Raymond

[57] ABSTRACT

A telescopic spring unit with two telescopic parts capable of being shifted, one in relation to the other, along a telescopic axis, which telescopic spring unit, when in its lengthened state, is lockable by means of a locking unit that is arranged on one of the telescopic parts and is pivotable around a tilting joint into a stop position. First and second pivoting elements are provided on the two telescopic parts, respectively, for pivotally connecting the spring unit to an articulated structural assembly. The pivoting elements of the telescopic part connected to the locking unit is attached to the locking unit, and the tilting joint and the pivoting elements are coordinated with one another in a manner such that, in the lengthened state of the telescopic spring unit, a force that acts on the telescopic spring unit through the two pivoting points in the compressive direction exerts a tilting moment on the locking unit which biases the locking unit around the tilting joint towards the stop position.

13 Claims, 4 Drawing Sheets

TELESCOPIC SPRING UNIT

BACKGROUND OF THE INVENTION

The invention concerns a telescopic spring unit with two telescopic parts which are shiftable, one in relation to the other, along a telescopic axis, wherein a first of the telescopic parts includes first pivoting means for pivotal attachment to a base unit of an articulated (hinged) structural assembly and the second of the telescopic parts includes second pivoting means for pivotal attachment to a hinged unit of the articulated structural assembly. One of the telescopic parts is connected to a locking unit which is swivelable or pivotable around a tilting joint, and which includes a stop for acting in conjunction with a counter-stop on the other telescopic part. The locking unit and the tilting joint are tiltable between two tilt positions—a stop position and a release position—in one of which, i.e., the stop position, the stop is aligned with the counter-stop in the direction of the telescopic axis and in the other of which, i.e., the release position, the stop is out of alignment with the counter-stop in the direction of the telescopic axis. The telescopic spring unit is modifiable in length between a shortened state and a lengthened state and, when in the lengthened state, the locking unit is pivotable between the stop position and the release position.

The Prior Art

JP-A-56-14636 discloses a telescopic spring unit of the above-described type, in which the telescopic unit comprises a pressurized gas spring and in which one telescopic part comprises the piston rod and the other telescopic part comprises the cylinder of the gas spring. A cylindrical locking sleeve is attached to the piston rod so as to be tiltable in the lengthened position of the gas spring between a release position and a stop position. The locking sleeve is dimensioned such that, in its release position, it can be pushed over the cylinder of the gas spring, thus permitting shortening of the gas spring by allowing penetration of the piston rod into the gas spring cylinder. At its lower end, the locking sleeve includes a projection which, when the gas spring is in its lengthened state, engages a helical compression spring that is arranged on the outer periphery of the cylinder of the gas spring. This helical compression spring pretensions the locking sleeve towards its stop position, so that the locking sleeve is swiveled by the force of the helical compression spring into its stop position as soon as the lower end of the locking sleeve disengages from the cylinder.

For the proper automatic locking of the foregoing known telescopic spring unit in the lengthened state, it is necessary to provide, in addition to the locking sleeve, a helical compression spring plus a support for the helical compression spring on the outer periphery of the cylinder. These components must be mounted when the gas spring is assembled.

By contrast, it is an object of the present invention to provide a telescopic spring unit that is more simply constructed and more economically producible, with automatic locking in the lengthened state.

SUMMARY OF THE INVENTION

According to the invention, this and other objects are attained by providing the pivoting means for the telescopic part that is connected to the locking unit on, or attached to, the locking unit, and by arranging the tilting joint and the aforementioned pivoting means (on or attached to the locking unit) relative to each other such that, when the telescopic spring unit is in the lengthened state, a compressive force on the telescopic spring unit acting through the two pivoting points (which compressive force may, for instance, be generated by a gravity moment of the hinged unit) exerts a tilting moment on the locking unit, which moment acts in the sense of trying to tilt the locking unit around the tilting joint into the stop position. In order to achieve automatic locking, it suffices, according to the invention, to provide the locking unit on the telescopic spring unit. The force required to tilt the locking unit into the stop position is derived, according to the invention, from the compressive force acting through the pivoting means, so that no special devices are needed to produce the locking force. This, on one hand, reduces the number of components of the telescopic spring unit according to the invention so that it affords a simpler construction. On the other hand, the number of steps required to assemble the gas spring unit is reduced, so that it can be produced more economically.

The force required for tilting the locking unit, after the gas spring unit is installed in the articulated structural assembly, e.g., into an automotive vehicle between the body and the tailgate, may be derived from a gravity moment of the tailgate acting counter to the force of the spring unit. In the lengthened state of the telescopic spring unit, this force occurs whenever the gravity moment of the tailgate acts upon the spring unit, e.g., either because the telescopic spring unit is designed to be strong enough to swivel the tailgate against the gravity moment until the telescopic spring unit has reached its lengthened state, or because a user has brought the telescopic spring unit into its lengthened state by swiveling the tailgate and thereafter releases the tailgate. However, before the telescopic spring unit is installed in the articulated structural assembly, the compressive force can also be applied to the spring unit by another means, e.g., manually, via the two pivoting means connected to the piston rod and the cylinder, respectively.

A simple way, in accordance with the invention, of deriving the force required to tilt the locking unit into its stop position from the compressive force applied to the gas spring unit is to provide (1) that the tilting joint has at least a first force-application point for transferring the force between the one telescopic part and the locking unit which, when the length of the telescopic spring unit changes, moves relative to the other telescopic part along a straight path of motion that runs substantially parallel to the telescopic axis and (2) that the pivoting means arranged on the locking unit has a second force-application point for transferring the force between the locking unit and the structural assembly which is arranged at a distance from the straight path of motion of the first force-application point.

In one embodiment, the design can be such that the straight path of motion of the first force-application point and the telescopic axis are substantially identical, and that the second force-application point is arranged at a distance from the telescopic axis. In this embodiment, one can start with a gas spring arrangement that is substantially conventional in form and the distance between the two force-application points can then be provided crosswise to the telescopic axis through the configuration of the locking unit.

Alternatively, it is also possible that the straight path of motion of the first force-application point be at a distance from the telescopic axis and that the second force-application point be arranged on the telescopic axis. In accordance with this embodiment, it is possible to maintain a form of the spring device with which the user is familiar (e.g., a cylindrically symmetrical form), while at the same time achieving the desired automatic locking with a simple construction of the spring unit.

In order to provide automatic locking with a conventional telescopic spring device, the tilting joint is preferably constructed as a ball-and-socket unit, wherein, when the locking unit tilts between the stop position and the release position, the socket unit is guided in ball-joint fashion on spherical part-surfaces around a center of the ball unit and, when the length of the telescopic spring unit changes, the center of the ball unit moves along a straight center-path that runs substantially parallel to the telescopic axis. Also, the ball unit and the socket unit are coordinated with each other in a manner such that the first force-application point is arranged at a distance from the straight center-path of the ball unit. This can be achieved in a simple manner by configuring the socket unit substantially in the shape of a pot and the ball unit as a ball which is cut in a manner such that a point of the ball—which point, when the tilting joint is ready to operate, lies closest to the bottom of the pot-shaped socket—is arranged at a distance from the straight center-path of the ball unit and forms the first force-application point.

In order to indicate to the user in a simple, positive manner that locking unit has moved from the stop position to the release position, the locking unit preferably includes a projection having an abutment surface which, in the lengthened state of the telescopic spring unit and in the release position of the locking unit, lies directly opposite to a counter-abutting surface on the other telescopic part.

In order to provide a simple way of permitting movement of the telescopic spring unit when it moves between its shortened and its lengthened state without subjecting the telescopic spring unit to bending or torsional stresses, preferably at least one of the first pivoting means, second pivoting means and tilting joint comprises a ball joint.

Guidance stability can be imparted to the telescopic spring unit during movement between the shortened and the lengthened states by providing at least one of the pivoting means, second pivoting means and tilting joint as a cylindrical joint.

In certain situations, it may be advantageous to be able to move the gas spring between its shortened and its lengthened states without the gas spring becoming automatically locked in the lengthened state. In order to temporarily disable the automatic locking function of the telescopic spring unit, it is proposed in a further embodiment of the invention that the first force-application point and the second force-application point be resettable in relation to each other, and preferably crosswise to the straight motion-path of the first force-application point, between two positions, in one of which positions the second force-application point is arranged on the straight motion-path of the first force-application point and in the other of which the second force-application point is arranged at a distance from the straight motion-path.

A preferred embodiment of the invention is a gas spring with a cylinder accommodating gas under pressure and a piston rod that is guided in a slidable manner through one end of the cylinder, where the cylinder and the piston rod form the two telescopic parts.

The invention further refers to an articulated structural assembly that encompasses two structural units—a base unit and a hinged or swiveled unit, which is supported in a manner capable of being swiveled with respect to the base unit around a substantially horizontal axis and is capable of being swiveled against the action of a gravity moment from a first end-position into a second end-position with respect to the base unit. In accordance with the invention, at least one telescopic spring unit is connected between the base unit and the hinged unit in order to assist the movement of the hinged unit with respect to the base unit against the action of the gravity moment.

BRIEF DESCRIPTION OF THE DRAWINGS

For a better understanding of the invention, reference may be made to the following description of representative embodiments thereof, taken in conjunction with the accompanying drawings, in which.

DETAILED DESCRIPTION OF REPRESENTATIVE EMBODIMENTS OF THE INVENTION

Figure 1A:
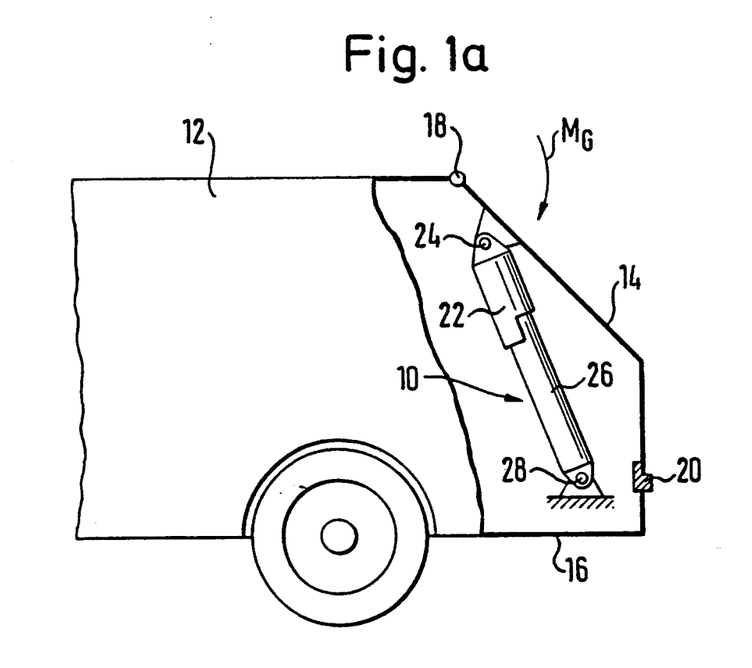
FIGS. 1a and 1b are schematic views of the rear of a vehicle equipped with a telescopic spring device according to the invention in order to swivel the vehicle's tailgate between a closed position (FIG. 1a) and an opened position (FIG. 1b)

FIG. 1a shows a telescopic gas spring unit, indicated generally at 10, which is arranged in a vehicle 12 between a tailgate 14 and a base or body 16. The tailgate 14 is connected at its upper end 18 (FIG. 1a) to the body 16 around a swivel axis that runs substantially horizontal and at its lower end (FIG. 1a) is supported at 20 on the body 16. A locking sleeve 22 of the spring unit 10 is pivoted at 24 on the tailgate 14, and a cylinder 26 of the spring unit 10 is pivoted at 28 on the body 16 of the vehicle 12.

Figure 1B:
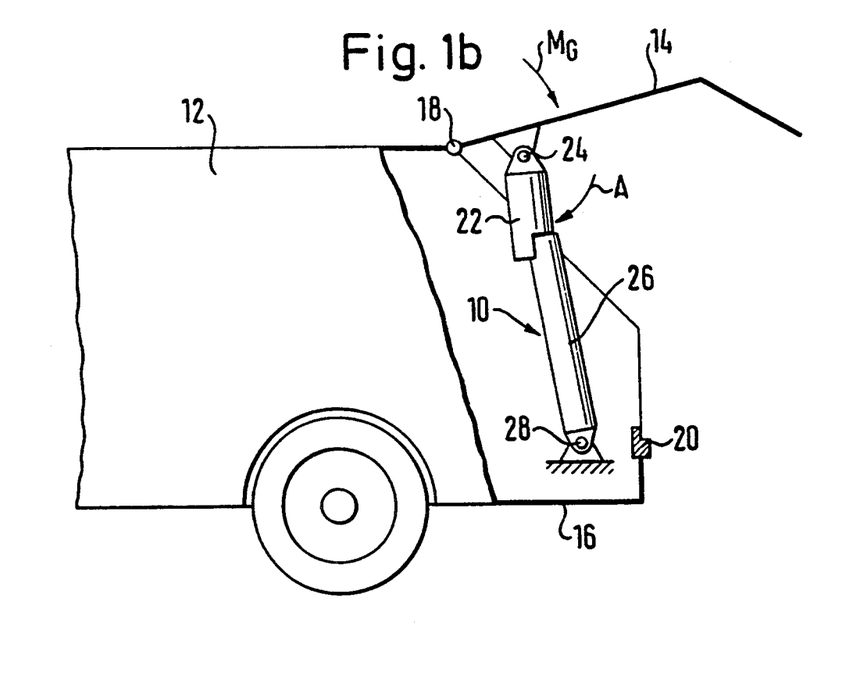

In FIG. 1a, the pressurized gas spring 10 is shown in its shortened state, in which a piston rod 30 (see, for instance, FIG. 2a) is pushed into cylinder 26. In FIG. 1b, it is shown in its lengthened state, in which the piston rod 30 is moved out of the cylinder 26. In order to extend the gas spring 10 to the position of FIG. 1b, the tailgate 14 of the vehicle 12 is opened counter to its gravity moment $M_G$. The force required therefor could be supplied completely by the gas spring 10 or part of that force could be supplied by the user, with the gas spring 10 only assisting the user during the swiveling movement of the tailgate 14.

When the lengthened state of the gas spring 10 according to FIG. 1b has been reached, the locking sleeve 22 of gas spring 10 swivels in the direction of the arrow A into its locked position shown in FIG. 1b. The tilting moment required for that purpose is triggered by a compressive force which is generated by the gravity moment $M_G$ of the tailgate 14 and which passes through the two pivoting points 24 and 28. A detailed step-by-step explanation of how this occurs will be provided further below.

In the preceding explanation, the vehicle 12 is the structural assembly, the tailgate 14 is the hinged or swivel unit of the structural assembly, and the body 16 is the base unit. The piston rod 30 of the gas spring 10 constitutes one telescopic part of the spring unit, and the cylinder 26 constitutes the other telescopic part.

Figure 2A:
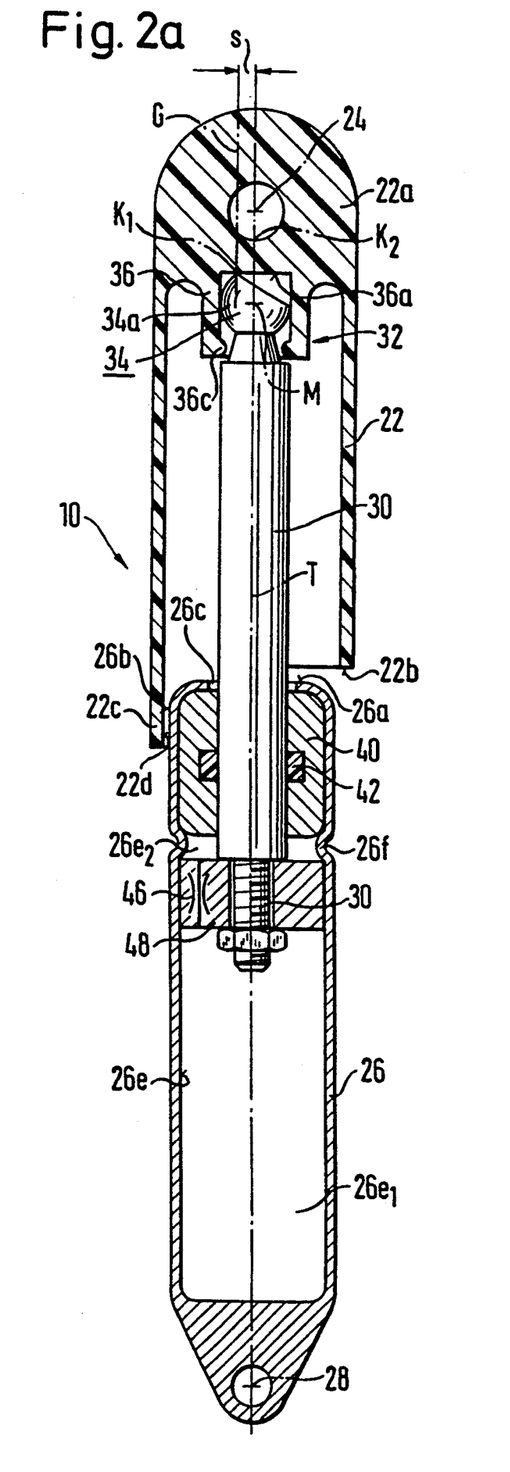
FIGS. 2a and 2b are sectional views of a first embodiment of the telescopic spring device, wherein the locking unit is shown in the release position (FIG. 2a) and in the stop position (FIG. 2b)
Figure 2B:
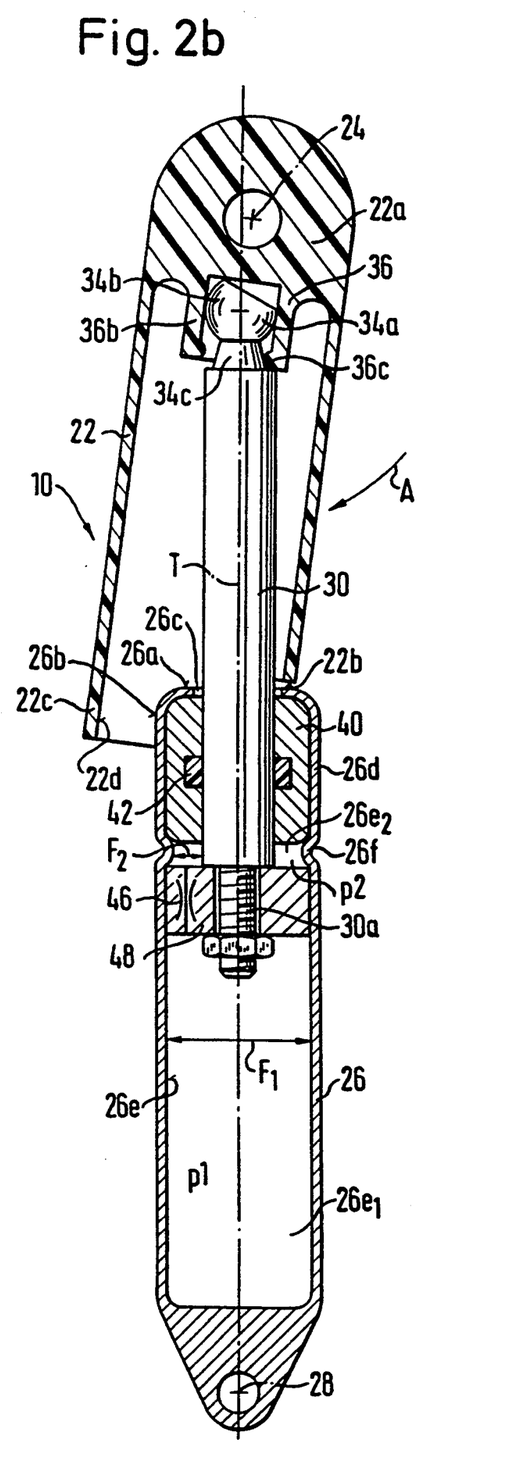

As shown in FIGS. 2a and 2b, the locking sleeve 22 is made up of a tube, preferably plastic, whose inside diameter is slightly larger than the outside diameter of cylinder 26, so that locking element 22, in the position shown in FIG. 2a, can be pushed over the cylinder 26 when gas spring 10 is shortened. The locking sleeve 22 is closed at its end distant from the cylinder 22a and is connected in ball-joint fashion to the piston rod 30 by means of a tilting ball joint 32.

The ball joint 32 includes a ball unit 34 on the piston rod side and a socket unit 36 on the locking sleeve side. The socket unit is preferably made in a substantially pot-like shape, i.e., with a cylindrical side wall 36b and a flat bottom 36a. The socket unit 36 is guided on spherical part-surfaces 34b of the ball unit 34. A center M of the ball unit 34 is arranged substantially on the telescopic axis T of the gas spring 10. The ball 34a of the ball unit 34 is cut in one its areas which lies opposite to the bottom 36a of the socket unit 36 in a manner such that a point $K_1$ on the ball 34a which lies closest to socket bottom 36a is arranged at a distance S from the telescopic axis T. In the case of lengthening or shortening of the gas spring 10, the point $K_1$ is moved along a straight motion-path G, as shown in FIG. 2a.

When a compressive force is applied through the pivoting means 24 and 28, such force is applied by the pivoting means 24 through a force-application point $K_2$ to the locking sleeve 22. The force-application point $K_2$ is arranged substantially on the telescopic axis T. The compressive force is transferred by the locking sleeve 22 through the force-application point $K_1$ to the ball 34a and thus to the piston rod 30. Since the force-application point $K_1$ is arranged at the distance S from the telescopic axis T, the compressive force produces a tilting moment which acts to swivel the locking sleeve 22 in a clockwise direction, i.e., in the direction of arrow A in FIG. 2b.

In the shortened or compressed position of the gas spring 10, as shown in FIG. 1a, the locking sleeve 22 is guided on the cylinder 26 so that tilting of the sleeve 22 is prevented. In the lengthened position of the gas-pressure spring 10 shown in FIGS. 2a and 2b, however, the locking sleeve 22 is no longer guided by cylinder 26 and the tilting moment that originates from the compressive force swivels the locking sleeve 22 in the direction of arrow A from its release position shown in FIG. 2a to the locking position shown in FIG. 2b. In the locking position, a stop 22b at the lower end of the locking sleeve 22 lies opposite a counter-stop 26a of the cylinder and prevents re-entry of the piston rod 30 into the cylinder 26.

A radially inwardly protruding annular rib 36c is provided at the lower end (as viewed in FIGS. 2a and 2b) of the lateral wall 36b of the socket unit 36. In the locking position of FIG. 2b, the rib 36c abuts against a connecting part 34c of the ball unit 34, shaped as a frustrum of a cone, and prevents tilting of the locking sleeve 22 beyond the locking position.

In order to unlock the gas spring 10, a user must tilt the locking sleeve 22 against the tilting moment derived from the compressive force until the stop 22b is out of alignment with the counter-stop 26a. The locking sleeve 22 is then once again in the release position of FIG. 2a. To provide a positive, noticeably indication to the operator that the release position has been reached and to prevent swiveling of the locking sleeve 22 beyond the release position, an axially extending projection 22c is provided at the lower end of the locking sleeve. The projection 22c is of a length sufficient to overlap the upper end-region of the cylinder 26 when the gas spring 10 is in the lengthened position, as shown in FIG. 2a. The inner surface 22d of the projection 22c defines a stop surface for engagement with a counter-stop surface 26b on the cylinder 26 when the locking sleeve 22 swivels from the locking position according to FIG. 2b into the release position according to FIG. 2a and the release position is reached, thus indicating to the user in a clearly noticeable manner that the release position has been reached.

According to the invention, it is preferred that at least one of the pivoting means 24, the pivoting means 28 and the tilting joint 32 be designed as cylindrical joint in order to ensure sufficient guidance stability of the gas spring 10 between the body 16 and the tailgate 14.

The gas spring 10 may be of the conventional type used in automotive applications of the kind described herein. As illustrated in FIGS. 2a and 2b, in such a gas spring the piston rod 30 enters into an internal chamber 26e of the cylinder 26 through an opening 26c (see FIG. 2b) in the upper end-region 26d of the cylinder 26. In the end section 26d of the cylinder 26, a guide unit 40 with a seal 42 is provided for the guidance of the piston rod 30. The guide unit 40 is held by a circumferential groove 26f formed in the wall of the end section 26d of the cylinder 26. The internal chamber 26e of the cylinder 26 is filled with a compressed gas.

A piston unit 44 is fixed to the inner end 30a of the piston rod 30 and divides the internal chamber 26e of the cylinder 26 into a lower working chamber 26e1 and an upper working chamber 26e2. The piston 44 is subject on one side to the pressure p1 prevailing in the lower working chamber 26e1 upon an area F1 (substantially equivalent to the total cross-sectional area of the piston) and on the other side to the pressure p2 prevailing in the upper working chamber 26e2 upon an annular area F2, which is the result of subtracting the cross-sectional area of the piston rod 30 from the cross-sectional area of the piston 44.

The piston unit 44 is equipped with a damping orifice or passage 46 which dampens the movement of the piston rod 30 relative to the cylinder 26 and which permits pressure equalization between the upper and lower working chambers 26e1 and 26e2. Starting with the piston 44 at rest, i.e., with equal pressures p1 and p2 in the working chambers 26e1 and 26e2, a net outward force acts upon piston 44 tending to urge the gas spring 10 into its lengthened state.

Figure 3:
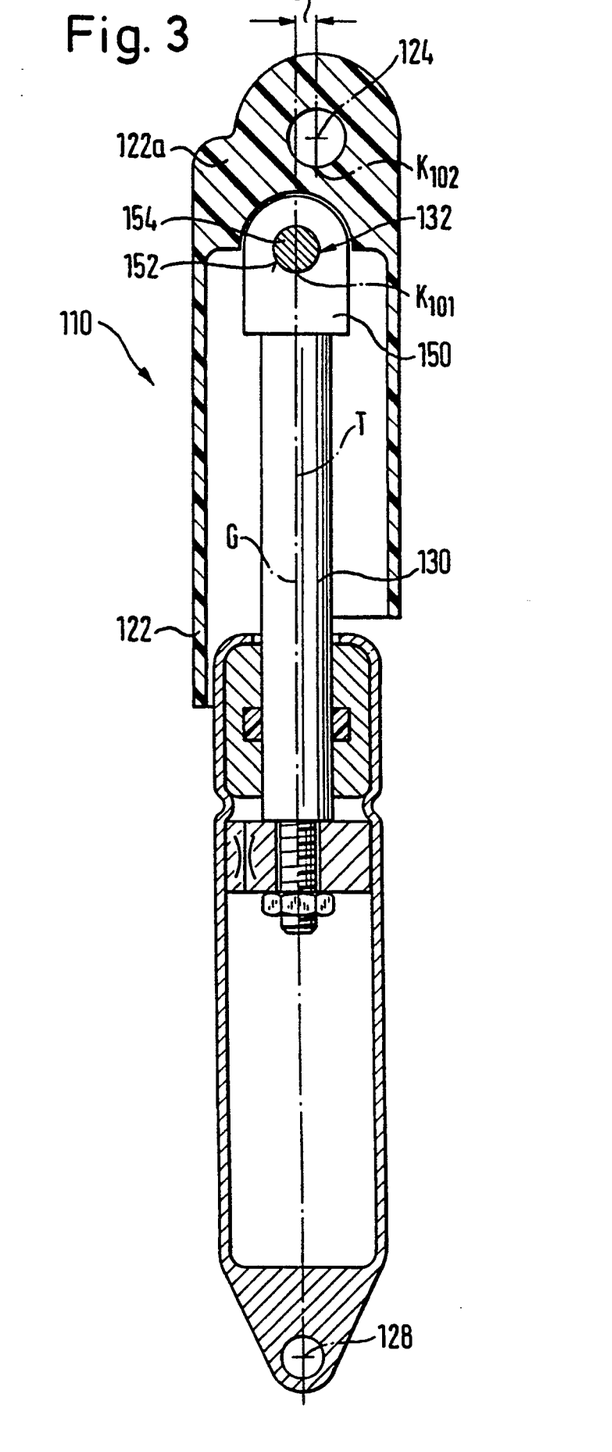
FIG. 3 is a view analogous to FIG. 2a of a second embodiment of the telescopic spring unit.

FIG. 3 depicts a further embodiment of the spring unit according to the invention, corresponding in large part to the embodiment of FIGS. 2a and 2b. Consequently, analogous parts are designated by the same reference numbers as in FIGS. 2a and 2b, except that they are augmented by 100. The gas spring unit 110 is described below only to the extent to which it differs from the embodiment described above. In all other respects, reference is made to the description of the first embodiment.

In the case of the embodiment according to FIG. 3, the tilting joint 132 is designed as a cylindrical joint. A bore 152 is provided in a head part 150 of the piston rod 130, which bore 152 is traversed by a swivel bolt 154 held in the head part 122a of the locking sleeve 122. A force-application point $K_{101}$, through which the compressive force acting through pivoting points 124 and 128 is transferred from the locking sleeve 122 and the swivel bolt 154 to the piston rod 130, is arranged on the telescopic axis T, which thus coincides with the straight motion-path G of the first force-application point $K_{101}$.

In the example of the embodiment according to FIG. 3, the second force-application point $K_{102}$, through which the pivoting means 124 transfers the compressive force to the locking sleeve 122, is shifted from the telescopic axis T by the distance S. In this manner, as in the case of the embodiment according to FIG. 3, the compressive force that acts through pivoting points 124 and 128 and originates from the gravity moment $M_G$ of the tailgate of the vehicle imposes a tilting moment on the locking sleeve 122, which tilting moment pretensions the locking sleeve 122 towards its locking position.

In the embodiment according to FIG. 3, at least one of the joints 124 and 128 is preferably designed as a ball joint in order to endow the gas spring with the capacity to avert bending moments upon the gas spring that may occur when the vehicle's tailgate is opened.

Figure 4A:
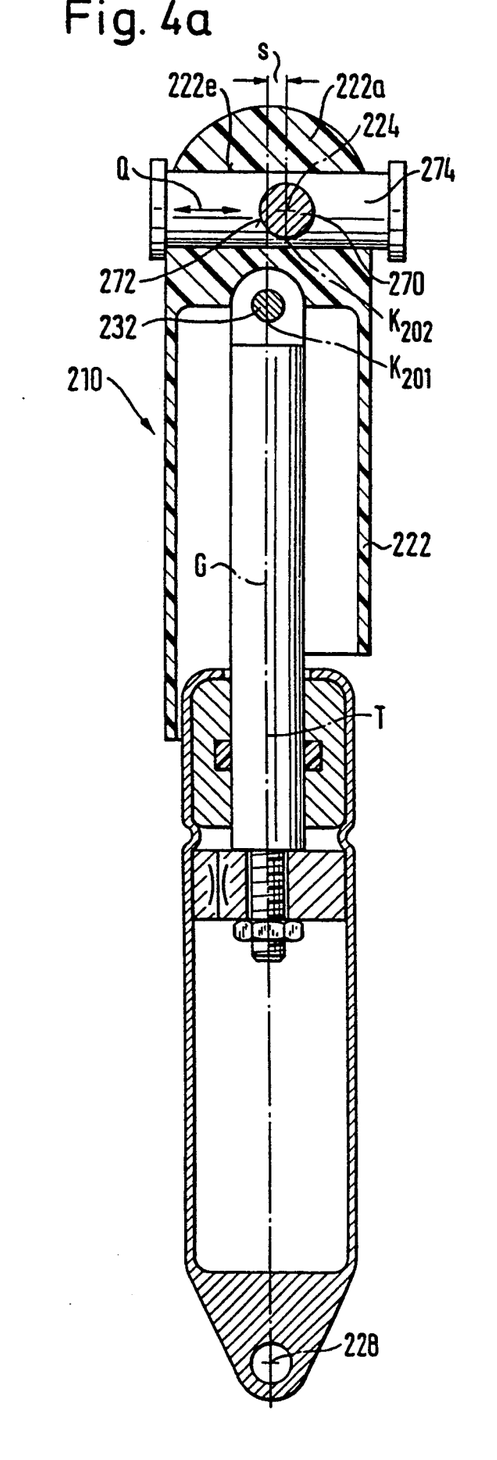
FIGS. 4a and 4b are sectional views of a third embodiment of the telescopic spring unit, in which the automatic locking function can be enabled (FIG. 4a) or disabled (FIG. 4b).
Figure 4B:
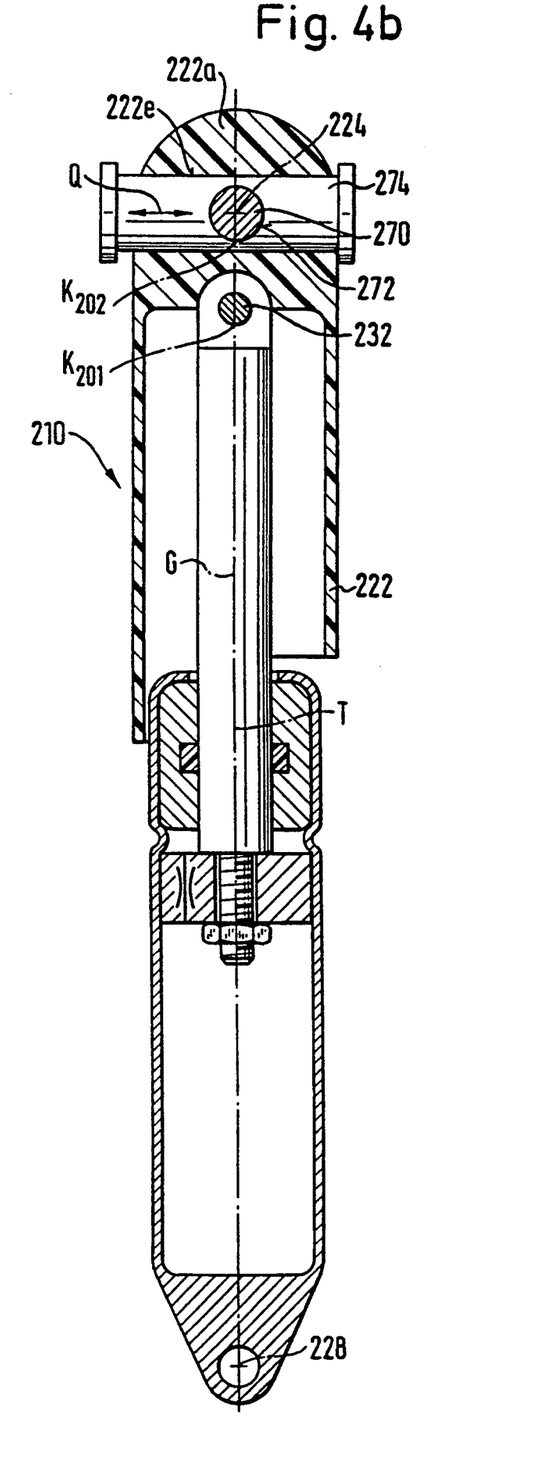

A further embodiment of the gas spring according to the invention is shown in the FIGS. 4a and 4b. This embodiment likewise is similar in most respects to the previously described embodiments, and analogous parts are designated by the like reference numbers as in FIGS. 2a and 2b, except that they are augmented by 200. The embodiment of FIGS. 4a and 4b is described below only to the extent to that it differs from the earlier embodiments described above.

The gas spring 210 according to the FIGS. 4a and 4b differs from the embodiments described above in that the automatic swiveling of the locking sleeve 222 as consequence of the compressive force acting through the pivoting points 224 and 228 can be enabled or disabled by shifting the pivoting point 224 in a direction that runs crosswise to the telescopic axis T, i.e., in the direction of the double arrow Q in FIGS. 4a and 4b.

In this embodiment, the pivoting means 224 is preferably designed as a cylindrical joint with a swivel bolt 270, attached to the body and/or the tailgate, which is guided in a bore 272 of a slide 274. The slide 274 is accommodated in a positive and non-positive manner in a passage 222e that extends through the head part 222a of the locking sleeve 222 in the direction of the arrow Q. In a manner analogous to the embodiment of FIG. 3, the tilting joint 232 is also designed as a cylindrical joint, so that the force-application point $K_{201}$ is arranged on the telescopic axis T.

If the slide 274 in FIGS. 4a and 4b is shifted to the right into the position according to FIG. 4a, the second force-application point $K_{202}$ is shifted by the distance S from the first force-application point's $K_{201}$ straight motion-path G, which coincides with the telescopic axis T, so that the compressive force that acts through the pivoting points 224 and 228 exerts a tilting moment upon the locking sleeve 222 in the direction of the locking position. With the slide 274 so positioned, the automatic function of the sleeve 222 is enabled.

If, on the other hand, the slide 274 is shifted to the left into the position according to FIG. 4b, the force-application point $K_{202}$ also lies on the straight motion-path G of the first force-application point $K_{201}$. Consequently, the compressive force acting through pivoting points 224 and 228 cannot exert a tilting moment on the locking sleeve 222. The automatic locking function of the sleeve 222 is thus disabled in the position of the slide 274 according to FIG. 4b. However, it continues to be possible as before to move the locking sleeve 222 into the locking position manually when the gas spring 210 is in the lengthened state.

Although the invention has been described and illustrated herein by reference to representative embodiments thereof, it will be understood that such embodiments are susceptible of modification and variation without departing from the inventive concepts disclosed. All such modifications and variations, therefore, are intended to be included within the spirit and scope of the appended claims.

We claim:

1. A telescopic spring unit (10), comprising:
    first and second telescopic parts (26, 30) capable of being shifted, one in relation to the other, along a telescopic axis (T) to lengthen or shorten the telescopic spring unit (10)
    first pivoting means (28) for pivotal attachment of the first telescopic part (26) to one of a base unit (16) and a hinged unit (14) of an articulated structural assembly (12);
    second pivoting means (24) for pivotal attachment of the second telescopic part (30) to the other of the hinged unit (14) and the base unit (16) of the articulated structural assembly (12);
    a locking unit (22);
    tilting joint means (32) for pivotally connecting the locking unit to one (30) of the first and second telescopic parts (26, 30) for pivotal movement relative to said one telescopic part (30) between a locking position and a release position when the telescopic spring unit (10) is in a lengthened state;
    the locking unit (22) including a stop (22b) for acting in conjunction with a counter-stop (26a) on the other telescopic part (26) when the locking unit is in the locking position, the stop (22b) being aligned with the counter-stop (26a) in the direction of the telescopic axis (T) when in the locking position and being out of alignment with the counter-stop (26a) in the direction of the telescopic axis when in the release position; and
    means for connecting the pivoting means (24, 28) for said one telescopic part (30) to the locking unit (22) such that, when the telescopic spring unit (10) is in the lengthened state, a compressive force acting on the telescopic spring unit (10) through the first and second pivoting means (24, 28) exerts a pivotal moment on the locking unit (22) which pivotally biases the locking unit (22) towards the locking position.

2. The telescopic spring unit according to claim 1, wherein:
    the tilting joint means (32) includes at least a first force-application point ($K_1$) for transferring the compressive force between said one telescopic part (30) and the locking unit (22), the first-force application point being positioned such that, when the length of the telescopic spring unit (10) changes, the first force-application point ($K_1$) moves relative to the other telescopic part (26) on a straight path of motion (G) that runs substantially parallel to the telescopic axis (T);

the pivoting means (24) for said one telescopic part (30) includes a second force-application point ($K_2$) for transferring the compressive force between the locking unit (22) and the structural assembly (12); and the second force-application point ($K_2$) is arranged at a distance (S) from the straight path of motion (G) of the first force-application point.

3. The telescopic spring unit according to claim 2, wherein:

the straight path of motion (G) of the first force-application point ($K_{101}$, $K_{201}$) and the telescopic axis (T) are substantially identical; and the second force-application point ($K_{102}$, $K_{202}$) is arranged at a distance (S) from the telescopic axis (T).

4. The telescopic spring unit according to claim 2, wherein:

the straight path of motion (G) of the first force-application point ($K_1$) is at a distance from the telescopic axis (T); and the second force-application point ($K_2$) is arranged on the telescopic axis (T).

5. The telescopic spring unit according to claim 2, wherein:

the tilting joint means (32) comprises a ball unit (34) and a socket unit (36);

the socket unit (36) being guided in ball-joint fashion on spherical part-surfaces (34b) around a center (M) of the ball unit (34) when the locking unit (22) pivots between the stop position and the release position;

the center (M) moves along a straight center-path that runs substantially parallel to the telescopic axis (T) when the length of the telescopic spring unit (10) changes; and the first force-application point ($K_1$) lies at a point of contact between the ball unit (34) and the socket unit (36) which is spaced at a distance (S) from the straight center-path.

6. The telescopic spring unit according to claim 5, wherein:

the socket unit (36) has a substantially cylindrical wall (36b) and a substantially flat bottom (36a) that is generally perpendicular to the telescopic axis (T) when the locking unit (22) is in the release position; and the ball unit (34) comprises a ball which is obliquely cut relative to the telescopic axis (T) such that the point ($K_1$) of the ball which lies closest to the socket bottom (36a) is spaced at a distance (S) from the straight center-path and forms the first force-application point.

7. The telescopic spring unit according to claim 1, wherein the locking unit (22) includes a projection (22c) which, in the lengthened state of the telescopic spring unit (10) and in the release position of the locking unit (22), defines an abutting surface (22d) which lies directly opposite to a counter-abutting surface (26b) on the other telescopic part (26).

8. The telescopic spring unit according to claim 1, wherein at least one of the first pivoting means (24), second pivoting means (28) and tilting joint means (32) comprises a ball-and-socket joint.

9. The telescopic spring unit according to claim 1, wherein at least one of the first pivoting means (24), second pivoting means (28) and tilting joint means (32) comprises a cylindrical joint.

10. The telescopic spring unit according to claim 2, wherein the means for connecting the pivoting means (24) for said one telescopic part (30) to the locking unit (22) includes means for positioning the first force-application point ($K_{201}$) and the second force-application point ($K_{202}$) at two different positions relative to each other, in one of which positions the second force-application point ($K_{202}$) is arranged on the straight motion-path (G) of the first force-application point ($K_{201}$) and in the other of which positions the second force-application point ($K_{202}$) is spaced at a distance (S) from the straight motion-path (G).

11. The telescopic spring unit according to claim 10, wherein the two relative positions of the first force-application point ($K_{201}$) and the second force-application point ($K_{202}$) are spaced apart in the direction crosswise to the straight motion-path (G).

12. The telescopic spring unit according to claim 1, wherein the telescopic spring unit comprises a gas spring (10) having a cylinder (26) that contains a compressed gas and a piston rod (30) which is guided through one end of the cylinder (26) for movement relative thereto, the cylinder (26) and the piston rod (30) comprising the first and second telescopic parts of the telescopic spring unit.

13. An articulated structural assembly (12), comprising:

a base unit (16);

a hinged unit (14) supported on the base unit (16) for pivotal movement with respect to the base unit (16) about a substantially horizontal axis (18), against the action of a gravity moment ($M_G$), between a first end-position and a second end-position;

at least one telescopic spring unit (10) connected between the base unit (16) and the swivel unit (14) for assisting the movement of the hinged unit (14) with respect to the base unit (16) against the action of the gravity moment ($M_G$);

the telescopic spring unit (10) including two telescopic parts (26, 30) which are shiftable one in relation to the other along a telescopic axis (T) between a shortened state which corresponds to the first end-position of the hinged unit (14) and a lengthened state which corresponds to the second end-position of the hinged unit (14);

first pivoting means (28) for pivotal attachment of one telescopic part (26) to the base unit (16);

second pivoting means (24) for pivotal attachment of the other telescopic part (30) to the hinged unit (14);

a locking unit (22);

tilting joint means (32) for pivotally connecting the locking unit (22) to said one telescopic part (30) for pivotal movement relative to said one telescopic part (30) between a locking position and a release position when the telescopic spring unit (10) is in said lengthened state;

the locking unit (22) including a stop (22b) for acting in conjunction with a counter-stop (26a) on the other telescopic part (26) when the locking unit is in the locking position, the stop (22b) being aligned with the counter-stop (26a) in the direction of the telescopic axis (T) when in the locking position and being out of alignment with the counter-stop (26a)

in the direction of the telescopic axis when in the release position; and means for connecting the first pivoting means (24) to the locking unit (22) such that, when the telescopic spring unit (10) is in said lengthened state, a compressive force acting on the telescopic spring unit (10) through the first and second pivoting means (24, 28) exerts a pivotal moment on the locking unit (22) which pivotally biases the locking unit (22) towards the locking position.

* * * * *